United States Patent
Zaitsev et al.

(10) Patent No.: US 10,146,355 B2
(45) Date of Patent: Dec. 4, 2018

(54) HUMAN INTERFACE DEVICE INPUT FUSION

(71) Applicant: Lenovo (Singapore) Pte. Ltd., Singapore (SG)

(72) Inventors: Grigori Zaitsev, Durham, NC (US); Antoine Roland Raux, Cupertino, CA (US); Rod D. Waltermann, Rougemont, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 22 days.

(21) Appl. No.: 14/670,096

(22) Filed: Mar. 26, 2015

(65) Prior Publication Data
US 2016/0283016 A1    Sep. 29, 2016

(51) Int. Cl.
| | |
|---|---|
| *G06F 3/041* | (2006.01) |
| *G06F 3/16* | (2006.01) |
| *G06F 3/0486* | (2013.01) |
| *G06F 3/0488* | (2013.01) |
| *G06F 3/0354* | (2013.01) |
| *G06F 3/14* | (2006.01) |
| *G06F 3/038* | (2013.01) |

(52) U.S. Cl.
CPC ............ *G06F 3/0416* (2013.01); *G06F 3/038* (2013.01); *G06F 3/03545* (2013.01); *G06F 3/03547* (2013.01); *G06F 3/041* (2013.01); *G06F 3/0486* (2013.01); *G06F 3/0488* (2013.01); *G06F 3/04883* (2013.01); *G06F 3/1454* (2013.01); *G06F 3/167* (2013.01); *G06F 2203/0381* (2013.01); *G06F 2203/04104* (2013.01)

(58) Field of Classification Search
CPC .... G06F 3/04883; G06F 3/0482; G06F 3/167; G10L 15/26
See application file for complete search history.

(56) References Cited

U.S. PATENT DOCUMENTS

| | | | |
|---|---|---|---|
| 5,600,765 A | 2/1997 | Ando | |
| 2004/0223089 A1* | 11/2004 | Hong | ..................... G06F 3/046 349/12 |
| 2008/0211766 A1* | 9/2008 | Westerman | ............. G06F 3/038 345/156 |
| 2011/0283212 A1 | 11/2011 | Warner | |
| 2013/0063369 A1* | 3/2013 | Malhotra | ............ G06F 3/04883 345/173 |

(Continued)

FOREIGN PATENT DOCUMENTS

| | | |
|---|---|---|
| CN | 103716454 A | 4/2014 |
| EP | 0594129 A2 | 4/1994 |

*Primary Examiner* — Chun-Nan Lin
(74) *Attorney, Agent, or Firm* — Ference & Associates LLC

(57) ABSTRACT

One embodiment provides a method, including: accepting, at a first input device of an electronic device, a first user input for an object resident on the electronic device; partially completing, using a processor, a user action based on the first user input; accepting, at another type of input device of the electronic device, a user input associated with the first user input for the object; combining, using a processor, the first user input for the object and the user input; and completing, using a processor, the user input action for the object based on the combined first user input and the user input. Other aspects are described and claimed herein.

20 Claims, 3 Drawing Sheets

(56) References Cited

U.S. PATENT DOCUMENTS

| | | | | |
|---|---|---|---|---|
| 2013/0154962 A1* | 6/2013 | Kim | ..................... | G06F 3/0488 |
| | | | | 345/173 |
| 2013/0257753 A1* | 10/2013 | Sharma | ................. | G06F 3/0488 |
| | | | | 345/173 |
| 2015/0178043 A1* | 6/2015 | Yuan | ..................... | G06F 3/167 |
| | | | | 715/728 |

* cited by examiner

HUMAN INTERFACE DEVICE INPUT FUSION

BACKGROUND

Electronic devices (e.g., smart phones, tablets, smart watches, laptop computers, personal computers, smart televisions, etc.) may include various types human interface devices (HIDs). For example, an HID may be a pointing device (e.g., mouse, trackball, touch pad, pointing stick, etc.), a keyboard, a touch screen, etc. HIDs may be provided by combinations of devices operating together, such as a microphone (for input) and a loudspeaker (for output).

An HID's type may be defined by the mode of providing input and/or output. For example, one type of HID may operate using touch or gesture as an input mode with output being displayed in a visual mode, whereas another type of HID may operate using audio input and output mode, e.g., a microphone and voice processing capabilities for input and a loudspeaker for output. Electronic devices thus often include a variety of types of HIDs (also referred to herein simply as input devices or output devices depending on the context).

BRIEF SUMMARY

In summary, one aspect provides a method, comprising: accepting, at a first input device of an electronic device, a first user input for an object resident on the electronic device; partially completing, using a processor, a user action based on the first user input; accepting, at another type of input device of the electronic device, a user input associated with the first user input for the object; combining, using a processor, the first user input for the object and the user input; and completing, using a processor, the user input action for the object based on the combined first user input and the user input.

Another aspect provides an electronic device, comprising: a first input device; another type of input device; a processor operatively coupled to the first input device and the another type of input device; a memory device that stores instructions executable by the processor to: accept, at the first input device, a first user input for an object resident on the electronic device; partially complete a user action based on the first user input; accept, at the another type of input device of the electronic device, a user input associated with the first user input for the object; combine the first user input for the object and the user input; and complete the user input action for the object based on the combined first user input and the user input.

A further aspect provides a product, comprising: a storage device having code stored therewith, the code being executable by the processor and comprising: code that accepts, from a first input device of an electronic device, a first user input for an object resident on the electronic device; code that partially completes a user action based on the first user input; code that accepts, from another type of input device of the electronic device, a user input associated with the first user input for the object; code that combines the first user input for the object and the user input; and code that completes the user input action for the object based on the combined first user input and the user input.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

Figure 1:
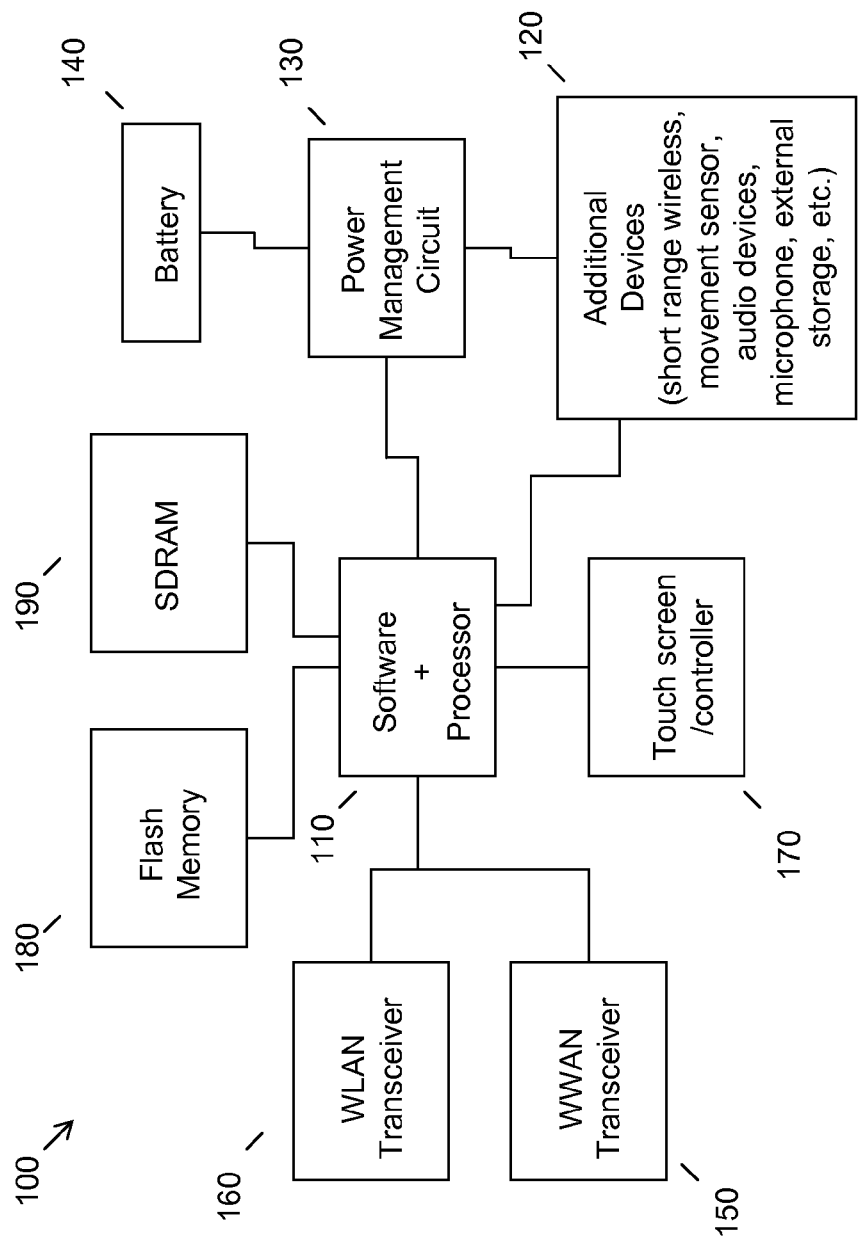
FIG. 1 illustrates an example of information handling device circuitry.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

Using human interface devices (HIDs), e.g., a touch input device, a user may perform various actions on an object, e.g., drag and drop a file, etc. Likewise, using voice processing capabilities and another type of input device, e.g., a microphone and speech recognition system, the information handling device may be able to recognize verbal commands and perform actions based upon the verbal commands.

When a user uses drag and drop feature, e.g., using a touch input or a pen gesture over a file, or performs similar actions, sometimes there is more information needed for the user input action to be completed. For example, the user touch input or pen input such as a drag and drop of a file may be considered a partial user input action with respect to the file. That is, the partial user input action lacks specifics for completing the user action, e.g., where to send the selected file (such as to which social network site the file (e.g., picture) should be transmitted), to which monitor should the file be moved, etc.

Conventionally the user completes such partial input actions using the same HID and mode. For example, if touch input is being used to drag and drop a file, following such a drag and drop input, an additional menu or wizard may appear for the user to provide further touch input to complete the action. This type of solution makes user input slower and sometimes requires learning.

HID input (such as touch input, pen input, mouse input, keyboard input, etc.) may be improved by an embodiment via concurrent processing of various types or modes of input. For example, touch input may be improved by use of recorded user voice as input. The combination or fusion of touch and voice inputs may help a device determine a voice command that provides details for completing a partial user input action commenced with touch input. A voice command may be generated from a voice input by using a voice or speech recognition system and natural language processing (NLP).

By way of example, an embodiment may accept a first type of input, e.g., a user drag and drop of an object such as a file from one folder to another using touch input, and accept input from another type of input device, e.g., a microphone used to accept voice input including a "move" or "copy" voice command. This permits an embodiment to combine the types of inputs (here, touch and voice) to complete a partial user input action (here, a user dragging and dropping a file to another folder but not indicating if it is a copy or move/cut command). Thus, the voice input provides additional or supplemental data for the system to complete the user action on the file. This may be accomplished without further use of the original HID.

It is worth noting that although the term "file" is used throughout as an example object, the various embodiments may be used in connection with other objects, e.g., emails, calendar events, to-do items, contact information, files stored on cloud storage, etc. Thus the term file is used throughout as a convenient, representative example object, but this term is not to be construed as limiting.

As another example, when a user opens a file using touch input with a finger tip or a pen, an additional user voice command may be used to specify on which monitor this file should be displayed, e.g. "open this on the right monitor." In this example, the completion of the partial user action input is a modification of a user action. That is, the initial user action input is sufficient to open the file generally, but only to a default destination. The partial user action that is completed is the second part of the action, here, repositioning the opened file from a default destination to the right monitor. An embodiment may accomplish this by logically associating the "this" in the voice data with the partial user action (i.e., the file or object selected using touch input), and thereafter forming a voice command from the voice data of "open" and "right monitor," thereby completing the user action to open and position the touch-selected file on the right monitor.

As another example, if a user draws a share gesture over a file icon and says "Social Network Site A, friends only," an embodiment combines these inputs to indicate that file associated with the icon drawn over should be posted on a particular social network site (Social Network Site A) associated with a Social Network Site A account running on the device. This precludes the user from needing to click through a selection menu using touch input to indicate that the file should be shared on a particular social network site and selection of privacy settings such that it is only shared with friends.

By way of further non-limiting example, if a user provides touch input to drag and drop a file on or into an e-mail application or its icon and provides voice input of "John Doe," an embodiment may combine these inputs to complete the partial drag and drop user input action for the file. Specifically, an embodiment may determine that the user is indicating that this file should be sent to "John Doe" in device contacts via the e-mail application.

The illustrated example embodiments will be best understood by reference to the figures. The following description is intended only by way of example, and simply illustrates certain example embodiments.

While various other circuits, circuitry or components may be utilized in information handling devices, with regard to smart phone and/or tablet circuitry 100, an example illustrated in FIG. 1 includes a system on a chip design found for example in tablet or other mobile computing platforms. Software and processor(s) are combined in a single chip 110. Processors comprise internal arithmetic units, registers, cache memory, busses, I/O ports, etc., as is well known in the art. Internal busses and the like depend on different vendors, but essentially all the peripheral devices (120) may attach to a single chip 110. The circuitry 100 combines the processor, memory control, and I/O controller hub all into a single chip 110. Also, systems 100 of this type do not typically use SATA or PCI or LPC. Common interfaces, for example, include SDIO and I2C.

There are power management chip(s) 130, e.g., a battery management unit, BMU, which manage power as supplied, for example, via a rechargeable battery 140, which may be recharged by a connection to a power source (not shown). In at least one design, a single chip, such as 110, is used to supply BIOS like functionality and DRAM memory.

System 100 typically includes one or more of a WWAN transceiver 150 and a WLAN transceiver 160 for connecting to various networks, such as telecommunications networks and wireless Internet devices, e.g., access points. Additionally, devices 120 are commonly included, e.g., HIDs for user inputs of various types or modes such as touch input, voice input, etc. An HID commonly included in system 100 is a touch screen 170 for data input and display/rendering. System 100 also typically includes various memory devices, for example flash memory 180 and SDRAM 190.

Figure 2:
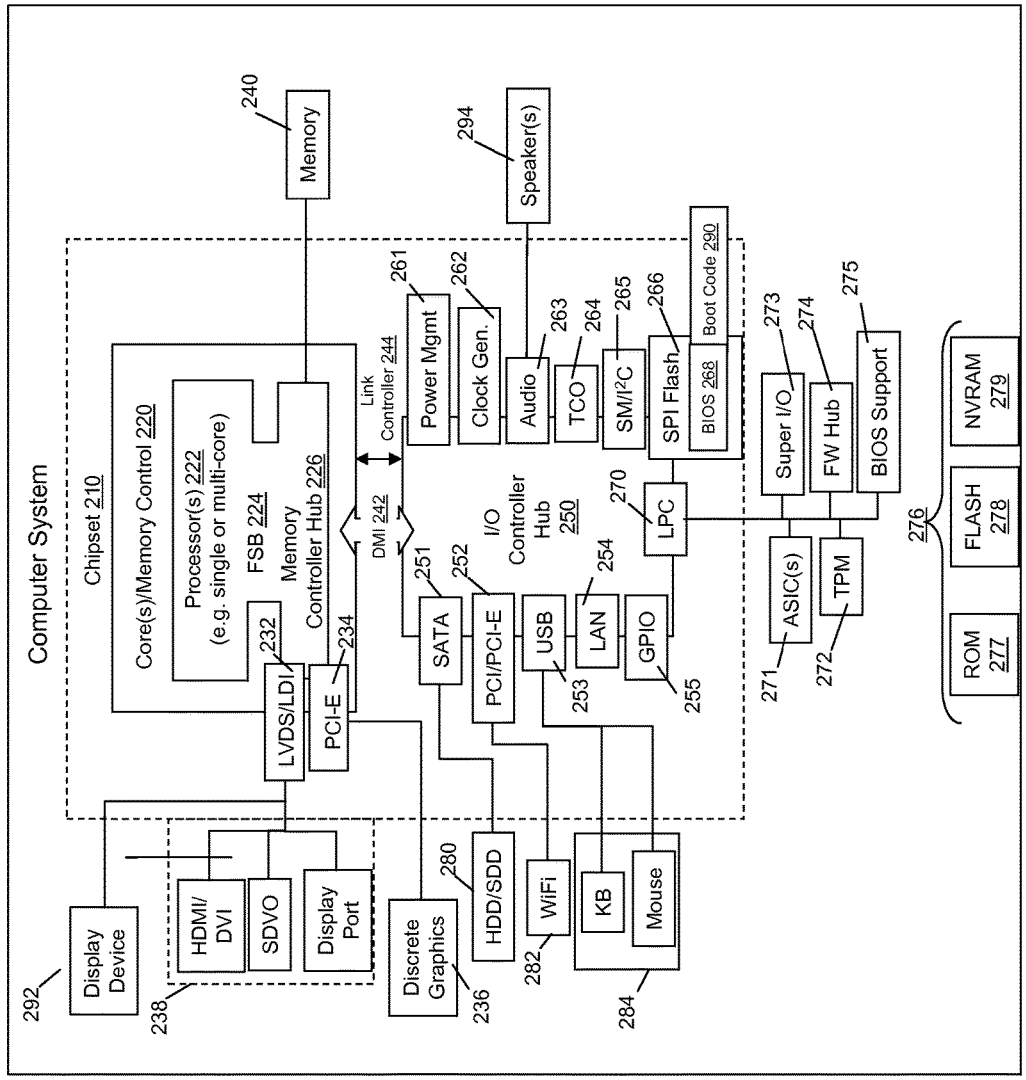
FIG. 2 illustrates another example of information handling device circuitry.

FIG. 2 depicts a block diagram of another example of information handling device circuits, circuitry or components. The example depicted in FIG. 2 may correspond to computing systems such as the THINKPAD series of personal computers sold by Lenovo (US) Inc. of Morrisville, N.C., or other devices. As is apparent from the description herein, embodiments may include other features or only some of the features of the example illustrated in FIG. 2.

The example of FIG. 2 includes a so-called chipset 210 (a group of integrated circuits, or chips, that work together, chipsets) with an architecture that may vary depending on manufacturer (for example, INTEL, AMD, ARM, etc.). INTEL is a registered trademark of Intel Corporation in the United States and other countries. AMD is a registered trademark of Advanced Micro Devices, Inc. in the United States and other countries. ARM is an unregistered trademark of ARM Holdings plc in the United States and other countries. The architecture of the chipset 210 includes a core and memory control group 220 and an I/O controller hub 250 that exchanges information (for example, data, signals, commands, etc.) via a direct management interface (DMI) 242 or a link controller 244. In FIG. 2, the DMI 242 is a chip-to-chip interface (sometimes referred to as being a link between a "northbridge" and a "southbridge"). The core and memory control group 220 include one or more processors 222 (for example, single or multi-core) and a memory controller hub 226 that exchange information via a front side bus (FSB) 224; noting that components of the group 220 may be integrated in a chip that supplants the conventional "northbridge" style architecture. One or more processors 222 comprise internal arithmetic units, registers, cache memory, busses, I/O ports, etc., as is well known in the art.

In FIG. 2, the memory controller hub 226 interfaces with memory 240 (for example, to provide support for a type of RAM that may be referred to as "system memory" or "memory"). The memory controller hub 226 further includes a low voltage differential signaling (LVDS) interface 232 for a display device 292 (for example, a CRT, a flat panel, touch screen, etc.). A block 238 includes some technologies that may be supported via the LVDS interface 232 (for example, serial digital video, HDMI/DVI, display port). The memory controller hub 226 also includes a PCI-express interface (PCI-E) 234 that may support discrete graphics 236.

In FIG. 2, the I/O hub controller 250 includes a SATA interface 251 (for example, for HDDs, SDDs, etc., 280), a PCI-E interface 252 (for example, for wireless connections 282), a USB interface 253 (for example, for devices 284 such as a digitizer, keyboard, mice, cameras, phones, microphones, storage, near field communication device, other connected devices, etc.), a network interface 254 (for example, LAN), a GPIO interface 255, a LPC interface 270 (for ASICs 271, a TPM 272, a super I/O 273, a firmware hub 274, BIOS support 275 as well as various types of memory 276 such as ROM 277, Flash 278, and NVRAM 279), a power management interface 261, a clock generator interface 262, an audio interface 263 (for example, for speakers 294), a TCO interface 264, a system management bus interface 265, and SPI Flash 266, which can include BIOS 268 and boot code 290. The I/O hub controller 250 may include gigabit Ethernet support.

The system, upon power on, may be configured to execute boot code 290 for the BIOS 268, as stored within the SPI Flash 266, and thereafter processes data under the control of one or more operating systems and application software (for example, stored in system memory 240). An operating system may be stored in any of a variety of locations and accessed, for example, according to instructions of the BIOS 268. As described herein, a device may include fewer or more features than shown in the system of FIG. 2.

Information handling device circuitry, as for example outlined in FIG. 1 or FIG. 2, may be used in electronic devices such as tablets, smart phones, and personal computer devices generally. In an embodiment, for example, an electronic device includes a touch screen that accepts pen and finger touch inputs and includes a microphone and voice processing software to perform actions associated with voice commands. Thus, the circuitry outlined in FIG. 1 may be implemented in a tablet or smart phone embodiment, whereas the circuitry outlined in FIG. 2 may be implemented in a personal computer embodiment.

Figure 3:
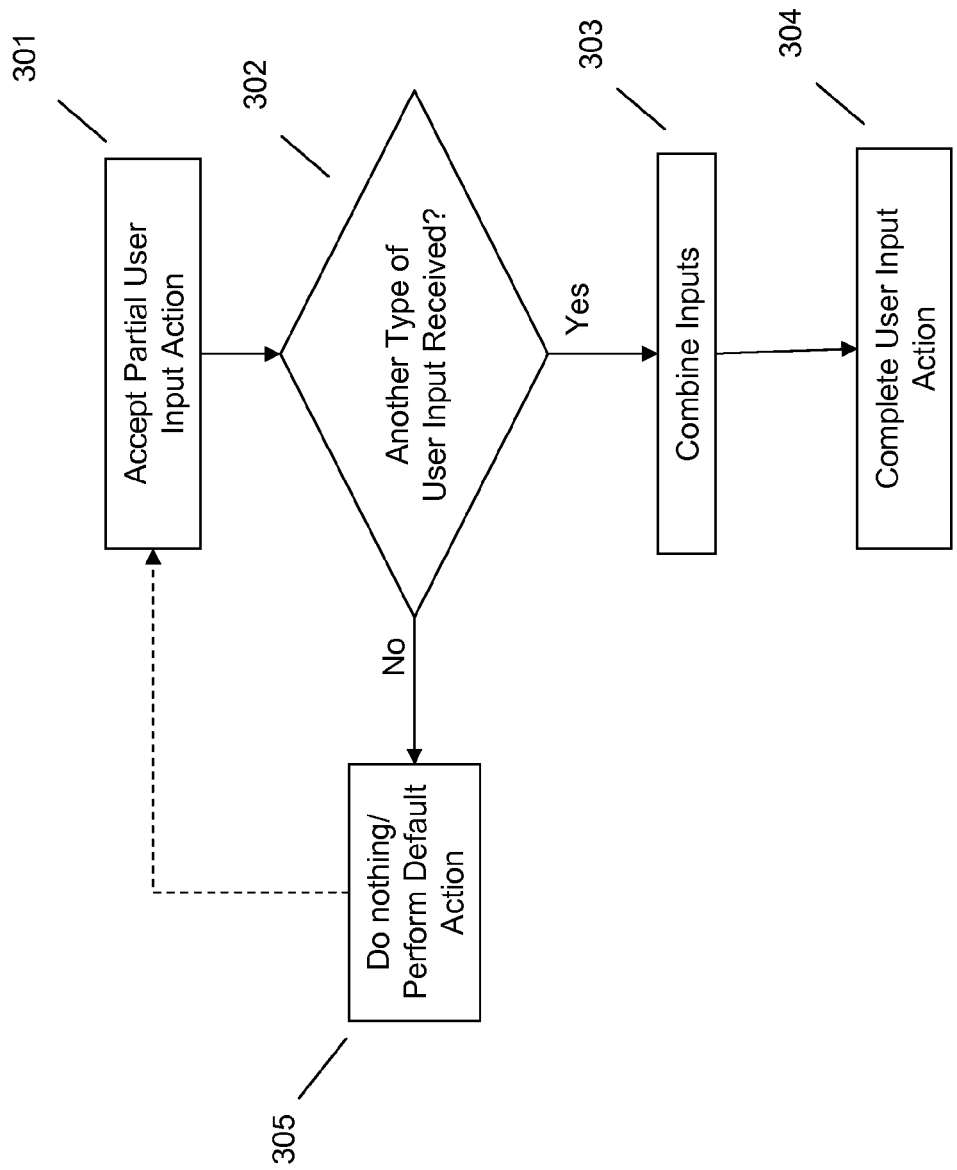
FIG. 3 illustrates an example method of input fusion using different input modes.

Referring now to FIG. 3, an embodiment provides a method of human interface device input fusion. As shown in FIG. 3, an embodiment accepts, at a human interface device such as a touch screen, a partial user input action for a file resident on the electronic device at 301. For example, a user may touch a file to select the file for opening, may drag and drop a file, e.g., into an email application, a user may draw a share gesture over a file using a pen or stylus, etc.

As described herein, for some actions (e.g., simply opening the file irrespective of destination, e.g., left or right monitor), such partial user input action as that received at 301 may be sufficient. However, in many circumstances, the system will not be able to complete the file action the user actually intends (e.g., sharing, sending the file in a messaging application, etc.) using only the data input at 301. In a conventional system, the user is required to provide further inputs in a particular manner (e.g., further touch inputs in series) to complete the action. This increases the time and complexity of completing the user input action on the file.

Accordingly, an embodiment determines at 302 if there is another type of user input received, e.g., from another type of input device such as a voice input received via a microphone of the electronic device. If such additional input data is present, an embodiment accepts the additional or supplemental data from the other input device. Part of the determination at 302, e.g., if the additional input is present and/or should be accepted as actionable input, may include determining if the additional or supplemental input data is associated with the partial user input action accepted at 301. For example, an embodiment may require that the other input data be received within a predetermined time (before or after the partial user input action).

This reference to an example "predetermined time" does not mean that that amount of time is always the same amount of time. Indeed, the size of the time window in which the two events occur to be fused can be determined in various ways, e.g., dynamically by the system based on the content of the commands themselves. By way of example, if a speech command contains a reference to pointing such as voice input of "this file," such input may be merged with the latest pointed at file, even if an amount of time has passed, which might not be the case if the command does not contain an explicit reference or an ambiguous reference. By way of example, voice input of "email John" may be processed by the system as a user action of starting a new blank email or emailing a particular file to John, depending on the context. Other factors aiding in determining a window size include context parameters such as ambient noise, an amount of information displayed on the screen, past use history (e.g., average time between related actions for this particular user, ect.

In such a case, e.g., a user drags and drops a file into an email application at 301 and shortly thereafter voices a command "send to John Doe," an embodiment may combine the partial user input action for the file and the user input at 303 such that a user input action for the file, e.g., sending the file to John Doe via email message, may be completed at 304 based on the combined partial user input action and the other user input.

Otherwise, i.e., when only the partial user input action is forthcoming, an embodiment may do nothing and await further user input (e.g., from another input device as described herein or the original input device) or may complete a default command, e.g., opening a file to a default monitor location, at 305. In other words, when there is no additional data that may be validly fused with the partial user input action, an embodiment may default to conventional behavior.

In an embodiment, the original input is touch input, for example provided to a touch screen using a fingertip or a pen/stylus, and the additional or other user input comprises voice input, for example provided to a microphone of the device and provided in turn to a speech recognition engine with a NLP capability. This allows an embodiment to form voice commands from natural language and map those commands to other input modes, e.g., touch based inputs to an application interface or menu that is designed for touch input. Having such additional data, an embodiment may combine this additional data with the touch input data of the partial user input action such that a full command may be provided to the application in question. Thus, an embodiment may translate alternative inputs, e.g., voice inputs, into touch based inputs for an application such as an email application.

As may be appreciated, the user input action that is completed using the fused inputs may vary, e.g., the user input action may be a file copy action, a file cut and paste action, a file movement action, a file share action, or a file transmission action, to name a few. In some instances, the partial user input action may be as simple as a file indication action. Depending on the quality and nature of the other input, e.g., voice based input, the user action on the file that is completed using the partial user input and the additional user input may be somewhat complex. By way of example, by simply indicating a file with touch input, while an email program is running, and providing voice input of "email this to John Doe," provides an embodiment enough input data to fuse the input data into a complete command for the email application to transmit the file indicated to the particular destination, here "John Doe." Alternatively, the other input, e.g., voice input, may be rather simple, e.g., the user input may simply be a voice input providing a destination indication, with the partial user input action being richer in content.

The various embodiments therefore represent a technical improvement in human device interface technology. For example, an embodiment facilitates completion of file actions, where a file is considered as any actionable object resident on the electronic device, such that a user may mix the modes of input for a more natural experience. By way of specific example, an embodiment omits the need for a user to learn to navigate complex menus that are designed for a single mode of input, e.g., touch input. Rather, an embodiment integrates natural language processing of voice inputs such that these may be mapped to their touch-based counterparts, allowing a user to reduce the amount of touch input necessary to complete a file action. This substantially improves the user interface capabilities of the device itself.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

It should be noted that the various functions described herein may be implemented using instructions stored on a device readable storage medium such as a non-signal storage device that are executed by a processor. A storage device may be, for example, an electronic, magnetic, optical, electromagnetic, infrared, or semiconductor system, apparatus, or device, or any suitable combination of the foregoing. More specific examples of a storage medium would include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a storage device is not a signal and "non-transitory" includes all media except signal media.

Program code embodied on a storage medium may be transmitted using any appropriate medium, including but not limited to wireless, wireline, optical fiber cable, RF, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication, or through a hard wire connection, such as over a USB connection.

Example embodiments are described herein with reference to the figures, which illustrate example methods, devices and program products according to various example embodiments. It will be understood that the actions and functionality may be implemented at least in part by program instructions. These program instructions may be provided to a processor of a device, a special purpose information handling device, or other programmable data processing device to produce a machine, such that the instructions, which execute via a processor of the device implement the functions/acts specified.

It is worth noting that while specific blocks are used in the figures, and a particular ordering of blocks has been illustrated, these are non-limiting examples. In certain contexts, two or more blocks may be combined, a block may be split into two or more blocks, or certain blocks may be re-ordered or re-organized as appropriate, as the explicit illustrated examples are used only for descriptive purposes and are not to be construed as limiting.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method, comprising:

accepting, at a first input device of an electronic device, a first user command for an object resident on the electronic device;

partially completing, using a processor, an action based on the first user command for the object, wherein the action requires two or more user commands to complete;

accepting, prior to completion of the action based on the first user command for the object and within a dynamically determined time period defined by a content of at least one of the first user command for the object and a second user command for the object, at another type of input device of the electronic device, the second user command for the object associated with the first user command for the object;

combining, using a processor, the first user command for the object and the second user command for the object; and completing, using a processor, the action for the object based on the combined first user command for the object and the second user command for the object.

2. The method of claim 1, wherein the second user command for the object comprises voice input.

3. The method of claim 1, wherein the action is selected from the group consisting of an object copy action, an object cut and paste action, an object movement action, an object share action, and an object transmission action.

4. The method of claim 1, wherein the first user command for the object is an object indication action.

5. The method of claim 4, wherein the second user command for the object is a destination indication.

6. The method of claim 1, wherein the first user command for the object is accepted by detecting touch input.

7. The method of claim 6, wherein the detecting touch input comprises detecting pen input.

8. The method of claim 1, wherein the first user command for the object is accepted by detecting gesture input.

9. The method of claim 8, wherein the detecting gesture input comprises detecting pen input.

10. The method of claim 1, wherein the action is completed by accepting an additional user command for the object.

11. An electronic device, comprising:
a first input device;
another type of input device;
a processor operatively coupled to the first input device and the another type of input device;
a memory device that stores instructions executable by the processor to:
accept, at the first input device, a first user command for an object resident on the electronic device;
partially complete an action based on the first user command for the object, wherein the action requires two or more user commands to complete;
accept, prior to completion of the action based on the first user command for the object and within a dynamically determined time period defined by a content of at least one of the first user command for the object and a second user command for the object, at the another type of input device of the electronic device, the second user command for the object associated with the first user command for the object;
combine the first user command for the object and the second user command for the object; and
complete the action for the object based on the combined first user command for the object and the second user command for the object.

12. The electronic device of claim 11, wherein the second user command for the object comprises voice input.

13. The electronic device of claim 11, wherein the action is selected from the group consisting of an object copy action, an object cut and paste action, an object movement action, an object share action, and an object transmission action.

14. The electronic device of claim 11, wherein the first user command for the object is an object indication action.

15. The electronic device of claim 14, wherein the second user command for the object is a destination indication.

16. The electronic device of claim 11, wherein the first user command for the object is accepted by detecting touch input.

17. The electronic device of claim 16, wherein the detecting touch input comprises detecting pen input.

18. The electronic device of claim 11, wherein the first user command for the object is accepted by detecting gesture input.

19. The electronic device of claim 18, wherein the detecting gesture input comprises detecting pen input.

20. A product, comprising:
a storage device having code stored therewith, the code being executable by the processor and comprising:
code that accepts, from a first input device of an electronic device, a first user command for an object resident on the electronic device;
code that partially completes an action based on the first user command for the object, wherein the action requires two or more user commands to complete;
code that accepts, prior to completion of the action based on the first user command for the object and within a dynamically determined time period defined by a content of at least one of the first user command for the object and a second user command for the object, from another type of input device of the electronic device, the second user command for the object associated with the first user command for the object;
code that combines the first user command for the object and the second user command for the object; and
code that completes the action for the object based on the combined first user command for the object and the second user command for the object.

* * * * *